Oct. 30, 1973  E. STOCKL  3,769,191
VIBRATORY CONVEYOR FOR THE CONTINUOUS ELECTROCHEMICAL
TREATMENT OF MASS-PRODUCED PARTS
Filed June 1, 1971
2 Sheets-Sheet 1
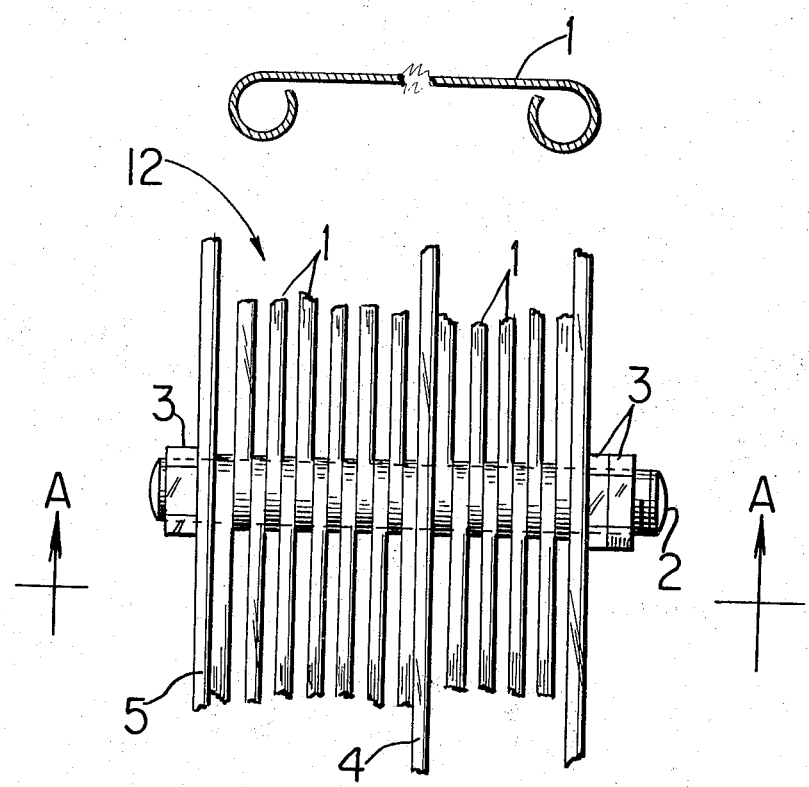
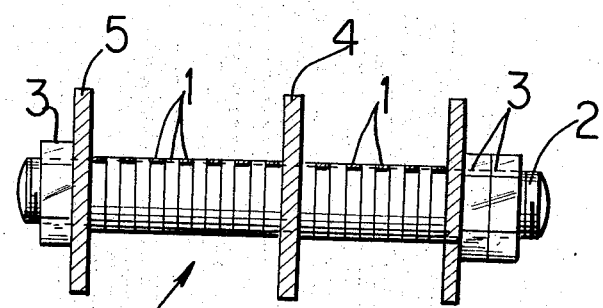
INVENTOR
ERICH STOCKL
BY
ATTORNEYS Oct. 30, 1973  E. STOCKL  3,769,191
VIBRATORY CONVEYOR FOR THE CONTINUOUS ELECTROCHEMICAL
TREATMENT OF MASS-PRODUCED PARTS
Filed June 1, 1971  2 Sheets-Sheet 2

INVENTOR,
ERICH STÖCKL
BY
ATTORNEYS

United States Patent Office 3,769,191
Patented Oct. 30, 1973

3,769,191
VIBRATORY CONVEYOR FOR THE CONTINUOUS ELECTROCHEMICAL TREATMENT OF MASS-PRODUCED PARTS
Erich Stockl, Munich, Germany, assignor to Poligrat Corporation, Zug, Switzerland
Continuation-in-part of abandoned application Ser. No. 807,209, Mar. 14, 1969. This application June 1, 1971, Ser. No. 148,870
Claims priority, application Germany, Mar. 16, 1968, P 15 56 730.3
Int. Cl. B65g 49/04; C23b 5/68
U.S. Cl. 204—201                     6 Claims

ABSTRACT OF THE DISCLOSURE

A vibratory conveyor track construction for use in the continuous electrochemical treatment of mass-produced parts which comprises a series of bolts, a plurality of removable wire links electrically conductively connected with said bolts and extending from one of said bolts to an adjacent bolt in each direction, means for connecting said bolts to one pole of a current source and means to impart a carrying motion to said bolts and wire links whereby a continuous vibratory conveyor track is formed and a solid deposited on said vibratory conveyor track will be conveyed in one direction.

REFERENCE TO PRIOR APPLICATION

This application is a continuation-in-part of my co-pending U.S. patent application Ser. No. 807,209, filed Mar. 14, 1969, and now abandoned.

OBJECTS OF THE INVENTION

An object of the present invention is the obtention of a device for the continuous electrolytic polishing and deburring of mass-produced parts utilizing a vibratory conveyor which is easily constructed and repaired and which is furthermore adjustable.

Another object of the invention is the obtention of a vibratory conveyor track construction for use in the continuous electrochemical treatment of mass-produced parts which comprises a series of bolts, a plurality of removable wire links electrically conductively connected with said bolts and extending from one of said bolts to an adjacent bolt in each direction, means for connecting said bolts to one pole of a current source and means to impart a carrying motion to said bolts and wire links whereby a continuous vibratory conveyor track is formed and a solid deposited on said vibratory conveyor track will be conveyed in one direction.

These and other objects of the invention will become more apparent as the description thereof proceeds.

THE DRAWINGS

FIG. 1 is a cross-section of the wire link of the invention.

FIG. 2 is a plan view showing the construction of the conveyor track.

FIG. 3 is a sectional view along line A—A of FIG. 2.

DESCRIPTION OF THE INVENTION

The above objects have been achieved by the invention in such a manner that a vibratory conveyor, for instance a spiral conveyor is constructed, whose current carrying conveyor track, in case of electrolytic polishing and deburring, is connected with the positive pole of a direct current source. The conveyor track is divided into individual sections, which are composed of individual wire links held together by the bolts attached to the positive pole of the direct current source.

A particularly simple execution of the device under the invention is achieved where the section of the conveyor track is attached by means of connecting bolts to a body, which can be induced to vibrate by a vibrator attached to it.

Such a conveyor track can be better utilized in conveying small parts, if the conveyor path is divided into 2 or more tracks, by means of sheet strips. By choosing the width of the track correspondingly, the parts which are conveyed for the purpose of a conitnuous electrolytic treatment, run in line one after the other, and thus the danger of mutual blocking is avoided.

The wire links which form the consecutive sections of the conveyor track are advantageously arranged in reverse order, on the connecting bolts interspersed between these consecutive sections. The wire links, bolts and other current carrying parts are made of material which resists the respective electrochemical process. With deburring and with electrolytic polishing, they should be constructed of materials which are resistant, in connection with the electrolyte utilized, to anodic erosion. For example, titanium, tantalum, zirconium, or a base metal which has been plated with these metals may be used.

An example of the form of execution under the invention is described in the attached drawings and thus gives a more detailed version.

Figure 4:
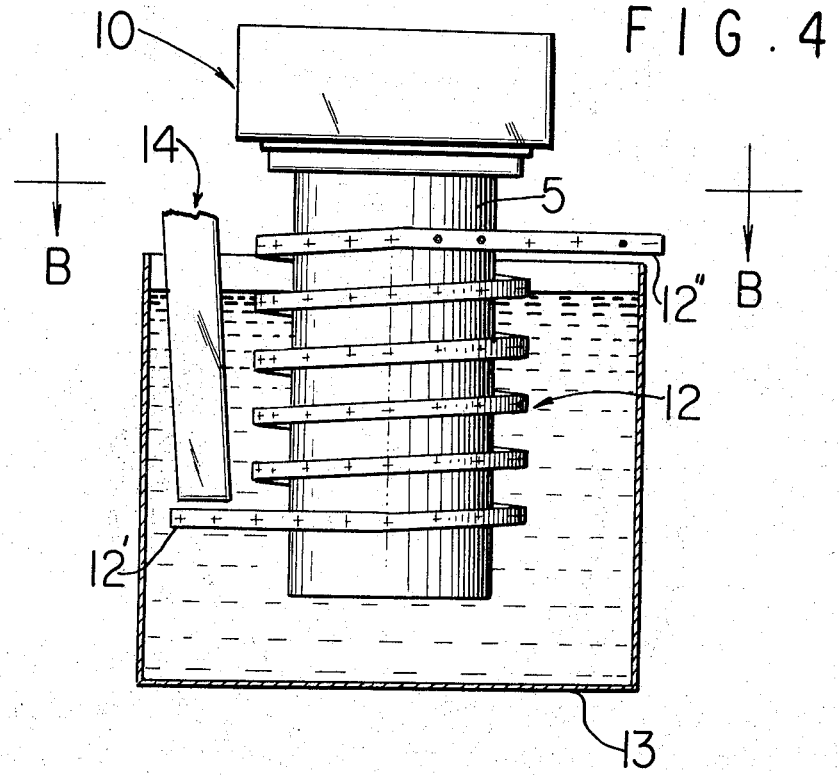
FIG. 4 is a view of the conveyor track of the invention arranged around a vibratory body.
Figure 5:
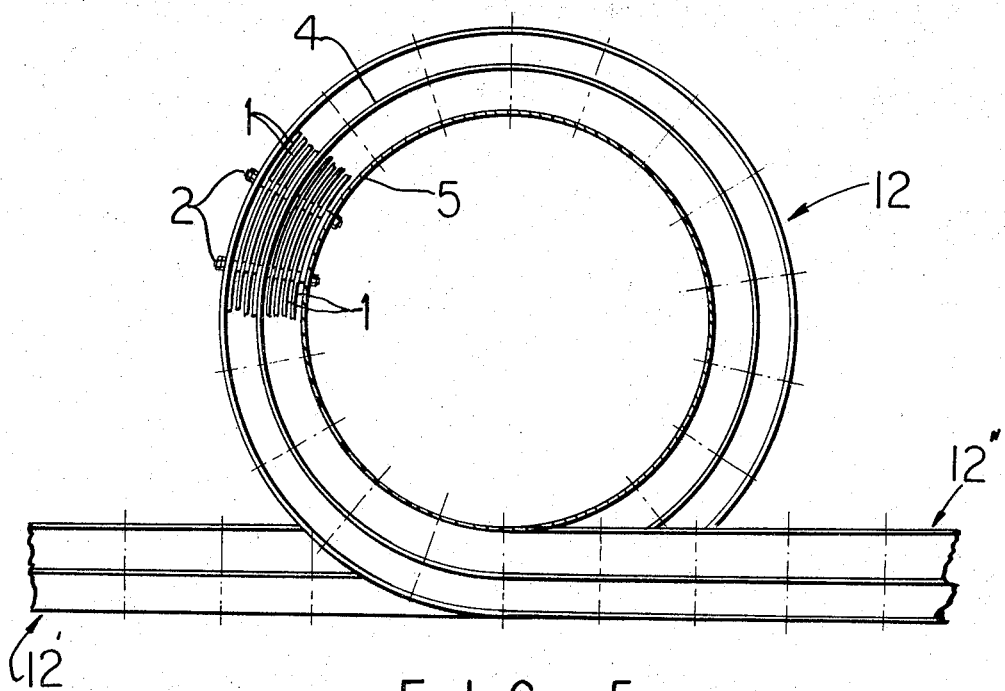
FIG. 5 is a sectional view along line B—B of FIG. 4.

FIG. 1 shows a cross-section of the wire link.
FIG. 2 shows the disposition of the attached wire links in a preferred position and the connection of the individual sections of the conveyor belt.
FIG. 3 describes a sectional view along line A—A in FIG. 2.
FIG. 4 shows the disposition of a spiral conveyor of the invention.
FIG. 5 shows a section along line B—B in FIG. 4.

The individual wire links are prefabricated in the desired lengths, out of wire with, for instance, a rectangular cross-section, and are bent in the form as shown in FIG. 1. These wire links 1 are inserted on bolt 2 through their loops according to FIGS. 2 and 3, so that the wire links of the two adjacent conveyor sections alternately enclose the bolt. The bolts 2 are attached to the vibratory body 5, and the individual wire links 1 are fastened together by nut 3 which, in turn is secured by a counter nut. Sheet strips 4 are inserted for the purpose of subdividing the arrangement into various synchronous running tracks. These strips 4 are together with the individual wire links 1 attached to the bolt 2. By appropriate synchronization of the length and strength of the wire links 1, and of the bolts 2 and the single track width, as well as by the corresponding bracing by means of counter bolts, a rigidity of the conveyor track in accordance with the requirements may be attained.

The drawings of FIGS. 4 and 5 show the assembled device of the spiral conveyor of the invention. A conventional magnet or vibratory drive 10 is supplied, on the underside of which a cylindrical vibratory body 5 has been attached. On this cylindrical vibratory body 5 wire members 1, and, for the subdivision of the conveyor track, sheet strips 4 are attached by means of bolts 2 in such a manner that a spiral shaped track 12 results herefrom. The cylindrical body 5 is immersed together with the spiral shaped track 12, into the container 13 containing an electrolytic bath. The lower end of the spiral shaped track 12 is formed in such a manner, that the parts entered by means of the supply device 14, arrive evenly spaced on the spiral shaped track 12.

While the device is operating, the parts arrive by means of the supply device 14 at the lower part 12′ of the spiral shaped track 12. When the cylindrical body 5 vibrates together with the spiral shaped track 12, at an appropriate frequency and amplitude, the parts are conveyed to the top of the spiral shaped track 12, and are at the same time treated in the desired manner. Finally, they are conveyed to the upper end 12'' of the spiral shaped track 12, where they are ejected by the device.

The parts can now be employed according to their purpose, or they may be treated once more.

For the purpose of electrolytical polishing and for the removal of burrs, the conveyor belt of the spiral shaped track 12 was attached to the positive pole, and the counter electrodes, not shown by the drawing, were connected with the negative pole of a direct current source. The conveyor track was submerged in an electrolytic bath which is likewise not shown in the drawing. In this case, it is advisable to weld the individual wire links, in order to guarantee an unhindered current transmission in the continuous use of the device.

Since the individual wire links in the conveyor path can form a curved path, no limits are set for the number of spiral courses which can be provided in the conveyor track. Therefore, conveyor tracks of any type of curvature, and also spiral conveyors of any optional cross section can be construed by the practice of the invention. Furthermore, it is possible to convert the conveyor course from a curved path into a straight path. Because of the very simple construction of the conveyor track of the invention, it is possible to repair the unit by exchange of the damaged parts of the track. The gaps in the conveyor track which are achieved by reverse arrangement of the individual wire links are as large as the individual links are wide. If a wider gap is required, shims can be placed between the individual wire links. Thus, the breadth of the gap in the conveyor track is variable, which is of particular importance for its use as contact track in galvanic baths. The conveyor track of the invention having many gaps can be removed without any difficulties from liquids, without the latter being carried along therewith.

The preceding specific embodiment is illustrative of the practice of the invention. It is obvious, however, that other expedients known to those skilled in the art may be employed without departing from the spirit of the invention.

I claim:

1. A vibratory conveyor track construction for use in the continuous electrochemical treatment of mass-produced parts which comprises a series of bolts, a plurality of removable wire links electrically conductively connected with said bolts and extending from one of said bolts to an adjacent bolt in each direction, means for connecting said bolts to the positive pole of a direct current source and means to impart a carrying motion to said bolts and wire links whereby a continuous electrically conductive vibratory conveyor track is formed and a solid deposited on said vibratory conveyor track will be conveyed in one direction, said bolts, wire links and means to impart a carrying motion to said bolts and wire links being constructed of a metal selected from the group consisting of titanium, tantalum, zirconium and a base metal plated with any of these.

2. The vibratory conveyor track of claim 1 wherein said means to impart a carrying motion to said bolts and wire links is a vibrating body to which said bolts are attached.

3. The vibratory conveyor track of claim 1 wherein said track is divided into a plurality of subtracks by sheet strips running in a continuous manner through said bolts.

4. The vibratory conveyor track of claim 1 wherein said wire links are removably connected with said bolts by means of a loop at each end of said wire links inserted in said bolts and nuts attached to said bolts.

5. The vibratory conveyor track of claim 1 wherein each of said wire links extends from one of said bolts to an adjacent bolt in each direction in an alternating manner whereby gaps are provided in said conveyor track.

6. The vibrator conveyor track of claim 1 immersed in an electrolyte container supplied with the other pole of said current source.

References Cited

UNITED STATES PATENTS

| | | | |
|---|---|---|---|
| 3,649,490 | 3/1972 | Nolan et al. | 204—201 |
| 3,306,432 | 2/1967 | Hoagland | 198—212 |
| 3,292,775 | 12/1966 | White | 198—220 BC |
| 2,853,180 | 9/1958 | White | 198—220 BC |

FOREIGN PATENTS

| | | | |
|---|---|---|---|
| 14,356 | 7/1964 | Japan | 204—222 |
| 6,359 | 5/1963 | Japan | 204—201 |

JOHN H. MACK, Primary Examiner

W. I. SOLOMON, Assistant Examiner

U.S. Cl. X.R.

198—220 BC; 204—222